United States Patent [19]

Emma

[11] 4,302,894

[45] Dec. 1, 1981

[54] MANUAL SHOVELLING AND DUMPING DEVICES

[76] Inventor: Sam F. Emma, 702 Hawthorne La., Geneva, Ill. 60134

[21] Appl. No.: 48,753

[22] Filed: Jun. 15, 1979

Related U.S. Application Data

[63] Continuation-in-part of Ser. No. 876,016, Feb. 8, 1978, abandoned.

[51] Int. Cl.³ .............................................. E01H 5/02
[52] U.S. Cl. ......................................... 37/130; 298/2
[58] Field of Search ...................... 414/490, 685, 743; 298/2; 37/53, 130; 294/54, 55; 280/47.37

[56] References Cited

U.S. PATENT DOCUMENTS

| | | | |
|---|---|---|---|
| 123,707 | 2/1872 | Kind | 280/47.37 R |
| 583,484 | 6/1897 | Kenaga | 37/130 |
| 861,274 | 7/1907 | Ensrud et al. | 37/130 X |
| 887,874 | 5/1908 | Toy | 37/130 |
| 3,028,695 | 4/1962 | Westby | 37/130 |
| 3,043,033 | 7/1962 | Ingram et al. | 298/2 X |
| 3,043,603 | 7/1962 | Major | 280/47.29 X |
| 3,107,446 | 10/1963 | Messinger | 37/130 |
| 3,833,262 | 9/1974 | Tasse | 298/2 |

*Primary Examiner*—Robert G. Sheridan
*Attorney, Agent, or Firm*—Hill, Van Santen, Steadman, Chiara & Simpson

[57] ABSTRACT

A roller supported scoop shovel is pivotally mounted on a forward portion of a wheeled mobile frame having generally upright handle means. Control of the shovel for material scooping, lifting, transporting, pushing and dumping modes is effected by means adapted to be manipulated adjacent to the top of the handle means. The frame is adapted to be rocked to facilitate operation of the shovel. All operations of the shovel including material scooping, lifting, pushing and dumping are adapted to be effected by a person remaining substantially erect. The device is readily collapsible for storage.

29 Claims, 19 Drawing Figures

MANUAL SHOVELLING AND DUMPING DEVICES

CROSS REFERENCE TO RELATED APPLICATIONS

This application is a continuation in part of application Ser. No. 876,016, filed Feb. 8, 1978, now abandoned.

FIELD OF THE INVENTION

This invention relates to new and improved manual shovelling and dumping devices, and is more particularly concerned with such devices which can be manipulated throughout a substantial working range without requiring stooping or bending by the person operating the devices, simply walking and arm and hand maneuvers being sufficient.

1. Description of the Prior Art

Loose material lying at ground level, such as snow, sand, loose dirt, mud, gravel, and the like, may be moved by means of a handled shovel requiring much back bending and exertion. Large volumes of such material may, of course, be moved by powered shovels and scoops such as bulldozers or other similar equipment. However a householder or maintenance person who has only a limited area premises to take care of needs only a relatively modest size material moving implement of which a simple handled scoop shovel, e.g. snow shovel, will suffice, or a small manually direct powered scooping or blower machine may be employed. In general, such equipment requires the person using the same to at least bend over or stoop in some phase of operation of the equipment. In use of a handled shovel this is obviously true. Most powered equipment requires such actions as supplying fuel, operating a starter, plugging in an electrical cord, effecting operating adjustments and the like involving at least some bending, or stooping. Therefore, such equipment frequently should not and often cannot be used by a person afflicted with a back, hip, neck, or other disability or affliction either precluding bending over or stooping or at least causing pain.

SUMMARY OF THE INVENTION

A principal aim of the present invention has been to provide a new and improved manual shovelling and dumping device which can be manuevered throughout a desirable range of operating capability while the user remains in a substantially erect position, that is in the position the person normally occupies when standing up and walking about and from which position the person may find it difficult or impossible to stoop or bend over.

Another aim of the invention is to provide a mechanical device which is fully manually operable and provides efficient mechanical advantage for handling loose ground lying material, without strain or unusual exertion on the part of the user.

A further aim of the invention is to provide a device of the character indicated which is readily collapsibly foldable for shipment or storage.

An additional aim of the invention is to provide a device of the character indicated which is light in weight, easily maneuverable with minimum exertion, simple and sturdy in construction, having a minimum of operating parts and adapted to be manufactured and sold as an efficient, low cost unit.

An embodiment of the invention comprises a manually operable shovelling and dumping device especially adapted for snow removal and the like, comprising a scoop shovel having a front scooping edge, a mobile frame having generally upright handle means, wheel means mounting said frame adjacent to the lower end of said handle means, means pivotally mounting said scoop shovel on a portion of said frame extending forwardly from said wheel means for pivoting about a horizontal axis between scooping and dumping positions relative to said frame, means adapted to be manipulated near the top of said handle means for controlling said scoop shovel in respect to said scooping and dumping positions, said wheel means permitting rocking of said frame by manipulation of said handle to raise said forward portion of said frame to facilitate pivoting of said scoop shovel between said scooping and dumping positions, and anti-friction roller means supporting the scoop shovel against contact rearwardly from said scooping edge with an underlying surface over which the device is operated, all of said means being cooperatively related to permit operation of the device with minimal effort by a person remaining substantially erect throughout a full range of operating manuevers of the device.

In addition to its scoooping and dumping capability, the device is adapted to be used as a snow or loose material pusher, and is also adapted for lifting a load of material scooped up in the shovel for transportation to a dump site where the scoop shovel is released to dump its load. To facilitate these capabilities, the handle means of the frame are adapted to be pivotally adjusted to various angular operative positions relative to the remainder of the frame.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure, and in which:

DESCRIPTION OF THE PREFERRED EMBODIMENTS

A manually operable shovelling and dumping device 15 (FIGS. 1-8), especially adapted for snow removal, comprises a scoop shovel 17, a mobile frame 18 having generally upright handle means 19, means 20 pivotally mounting the scoop shovel 17 on a forward portion 21 of the frame 18 for pivoting about a horizontal axis provided by an axle 22 between scooping (FIG. 5) and dumping (FIGS. 6 and 7) positions relative to the frame 18.

Means, comprising a control lever 23 adapted to be manipulated adjacent to the top of the handle 19 and including a connecting rod 24 pivotally attached at one end to the lever 23 and a control cable 25 connected at one end to the rod 24 and at its opposite end to the rear end portion of the scoop shovel 17, are adapted to control the scoop shovel in respect to its scooping and dumping positions relative to the frame 18. Means comprising wheels 27 adjacent to the lower end of the handle 19 and mounted on an axle 28 at the rear of the frame 18, and more particularly at the lower end of the handle 19, permit rocking of the frame 18 by manipulation of the handle 19 to raise the forward portion 21 of the frame to facilitate pivoting of the scoop shovel 17 between its scooping and dumping positions.

All of the several means of the device 15 are cooperatively related to permit full operation of the device by a person remaining substantially erect throughout scooping and dumping maneuvers of the device. Inasmuch as the device 15 has been devised expressly to be maneuvered manually, all parts are desirable constructed of as light weight materials and as compactly as feasible, consistent with loads and stresses that must be assumed by each part in and of itself and in cooperation with the other parts to the end that the device will be easy to use with minimum of strain upon the user, but will nevertheless be strong and rugged for long and effective service.

Referring to the scoop shovel 17, it is adapted to be fabricated from suitable gauge sheet metal and has a bottom scoop blade 29 of substantial width and depth which may have a desirable pattern of reinforcing ribs 30 running in a front to rear direction. Along its front edge, the blade 29 has a surface engaging edge 31 which although it is shown as free may be reinforced on its bottom side with a harder and more wear resistant material if the shovel 17 is made from aluminum, for example. A rear retaining wall portion 32 of the shovel 17 desirably extends obliquely inwardly and rearwardly from a juncture 33 with the blade 29. Reinforcing means such as a crossing pattern of stiffening ribs 34 may be provided on the rear wall portion 32. At each side, the shovel 17 has reinforcing and retaining wall means 35 defining with the blade and the rear wall portion 32 a substantial material receiving and handling recess or pocket. Along their top edges the side walls 35 are desirably reinforced as by means of rolled over respective flanges 37.

For substantially frictionless running of the scoop shovel 17, it is provided with at least rear running rollers 38 which conveniently comprise small wheels mounted on respective opposite end portions of the shaft 22 serving as an axle on which the rollers rotate freely. Mounting of the shaft 22 is conveniently effected at the rear of the shovel back portion 32 by means such as symmetrically nested generally U-shape mounting brackets 39 and 40 secured to the portion 32 as by means of rivets or screws 41. Location of the mounting bracket assembly 39,40 and the diameter of the rollers 38 is such that the rear portion of the blade 29 is slightly elevated above a surface S on which the rollers 38 and the scoop blade edge 31 are engaged in the scooping position of the shovel 17. Attachment of the frame bars 21 to the shaft 22 is desirably between angular, spaced pairs of supporting flanges 42 and 43 on the bracket bar member 39 and the bracket bar member 40, respectively, at each opposite end of the bracket assembly.

Means for connecting the flexible control cable member 25 to the scoop shovel 17 comprise a rigid bracket strap member 44 having opposite end portions secured as by means of rivets or screws 45 to respective opposite side portions of the upper rear margin of the rear shovel portion 32 which for reinforcement may be provided with an underturned reinforcing flange 47 providing a double thickness of material in the area to which the bracket strap member 44 is secured. For convenience the strap member is of a general rearwardly bowed configuration and carries in a plane with the longitudinal center of the shovel 17 a generally rearwardly extending eye member 48 to which a separable connection of the flexible member 25 is adapted to be made as by means of a snap-on hooked spring latch 49 having a rear anchor eye 50 to which an anchoring loop 51 (FIGS. 5 and 10) of the flexible member 25 is adapted to be secured. In a preferred securement of the loop 51, where the flexible member 25 is a cable, an end portion of the cable is threaded through the latch member eye 50, and then, in effect, splice-fastened to the adjacent body of the cable by means of a splicing device comprising a sleeve or ferrule 52 having an inside diameter within which the cable body and cable terminal portion are fairly snuggly received. Within the ferrule 52 the turned back end portion of the cable is locked against withdrawal by means comprising a set screw 53 (FIG. 11) threadedly mounted in a threaded bore 53a in the wall of the ferrule. The set screw 53 is adapted to be threadedly driven inwardly to clamp the cable portions within the ferrule tightly frictionally against one another and against the ferrule and thereby retain them against separation.

At its opposite end, the control cable 25 is anchored to the lower end of the control rod 24 in substantially the same manner as the scoop shovel end of the control cable is anchored to the latch member 49. For this purpose, the lower end of the control rod 24 is equipped with a rigid eye 54 and the cable has a loop 55 threaded through the eye 54. The loop 55 comprises a return bent portion of the cable which is, in effect, spliced to the body of the cable 25 by means desirably comprising another of the splicing devices 52.

At its upper end, the control rod 24 is so related to the control lever 23 that an overcenter latching arrangement is provided. To this end, the control lever comprises an elongate narrow U-shape member closed at its normally upper end and having parallel legs secured at the normally lower end of the control lever to a sleeve 57 which is journaled on a cross rod 58 connected to and between spaced elongate arms 59 of the handle 19 and sufficiently spaced from a top handle cross bar 60, having regard to a convenient functional length of the lever 23, for clearance to operate the lever 23 between an overcenter latching position as best exemplified in full line in FIG. 5 and a released position exemplified in dot-dash outline in FIG. 5 and in full outline in FIGS. 6 and 7. To attain the overcenter or toggle latch relationship of the control rod 24 and the control lever 23, and where, as is the desirable arrangement, the control cable 25 is guided about the underside and back of the axle shaft 28, the control rod 24 extends upwardly behind the sleeve 57 and into articulated connection with the lever 23 in the space between the lever legs. To attain the toggle latch relationship, an upper end portion 61 of the rod 24 extends angularly upwardly and forwardly from a bend 62 at which the rod is adapted to engage the bearing sleeve 57 in the toggle latch position. At its upper end, the toggle latch portion 61 of the rod has a lateral angular terminal pintle 63 engaged pivotally through a suitable journal hole in one of the legs of the lever 23 at a point suitably above the center of the length of the lever 23 and desirably centered on the longitudinal axis of the lever. Through this arrangement, automatic latching of the shovel control system to maintain the shovel 17 in the scooping position is attained by orienting the latch lever 23 in its upright position wherein the control cable 25 is maintained in a reasonably taut condition. To assist in maintaining the toggle latch position of the control lever 23, the opposite ends of the bearing sleeve 57 are preferably in sufficient frictional engagement with the contiguous surfaces of the handle arms 59 to provide a mild frictional clutching engagement which can be overcome without excessive exertion by manual swinging of the control lever 23 between its toggle latch and released positions.

Figures 1, 2:
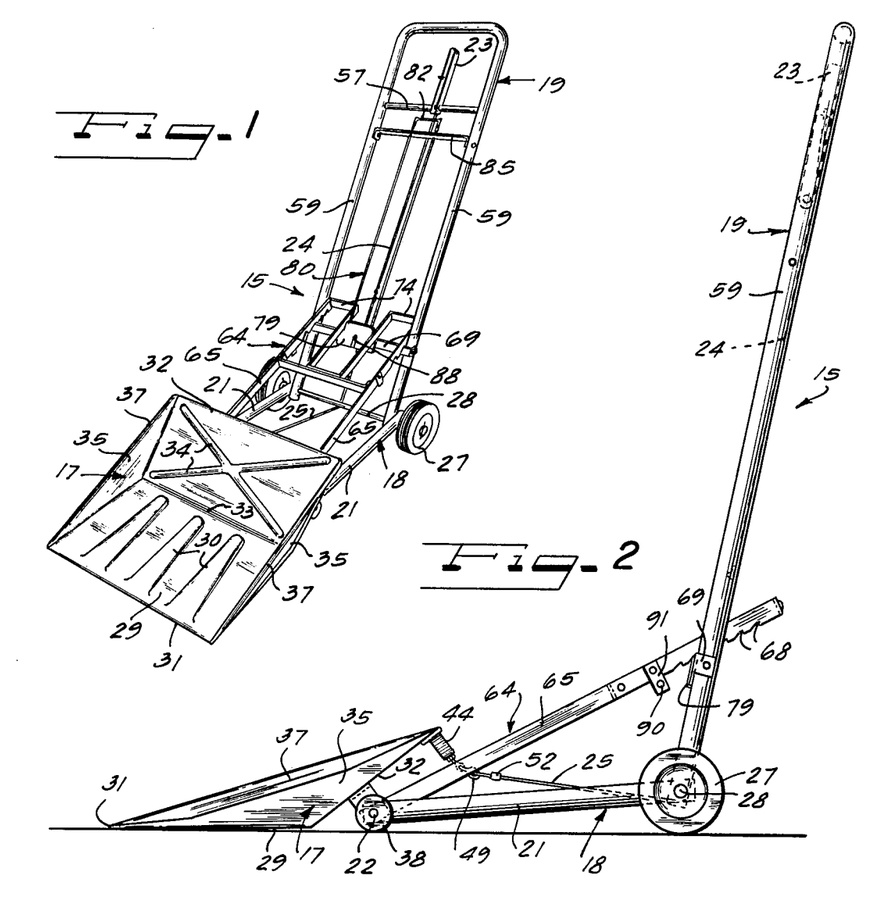
FIG. 1 is a perspective view of a device embodying the invention.
FIG. 2 is a side elevational view of the device.
Figure 3:
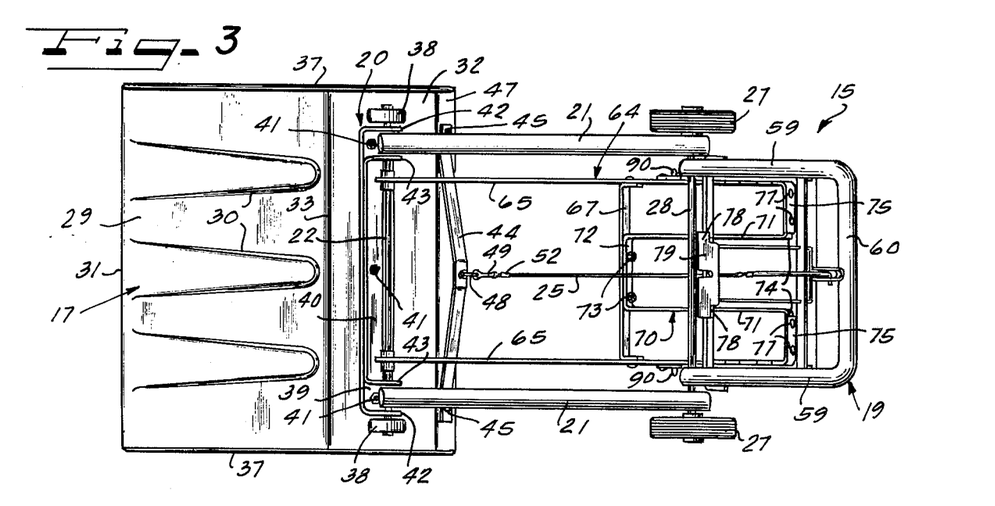
FIG. 3 is a bottom plan view of the device.
Figures 4, 5, 6:
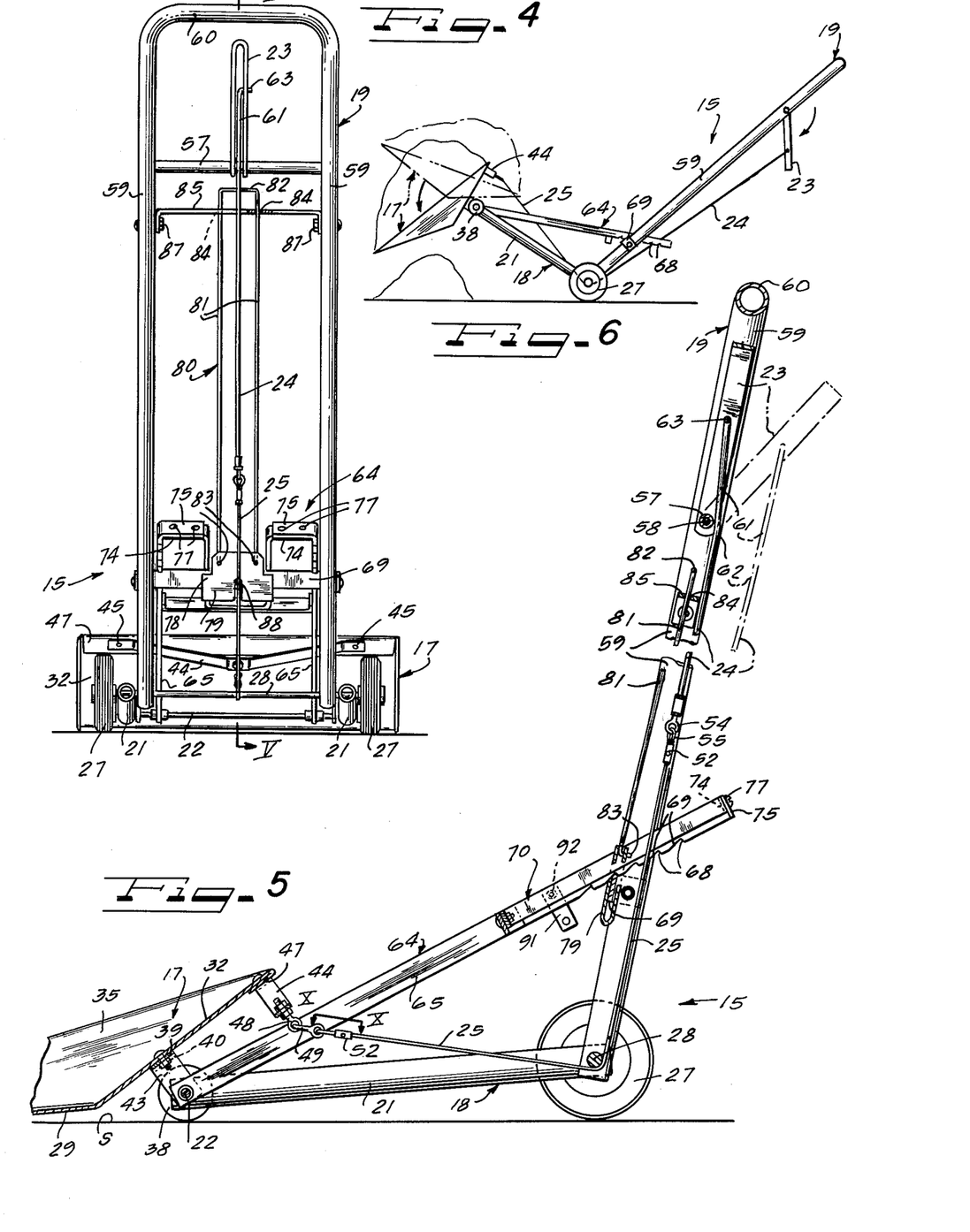
FIG. 4 is a rear elevational view of the device.
FIG. 5 is a fragmental vertical sectional detail view taken substantially along the line V—V of FIG. 4.
FIG. 6 is a schematic side elevational view of the device demonstrating its lifting and dumping capability.

For convenience in manipulating and maneuvering the device 15, means are preferably provided to permit the handle 19 to be tiltably adjusted between a substantially fully upright position and at least one and preferably a plurality of convenient rearwardly tilted positions. To this end the rear ends of the two bars providing the forward frame portion 21 and the lower ends of the handle arms 59 are preferably pivotally connected to the rear axle shaft 28, and means comprising an adjustable brace frame 64 provides a diagonal connection between the front end of the front portion 21 of the frame 18 and the handle 19 in a generally triangular relationship. In a desirable construction, the brace frame 64 comprises a pair of spaced elongate arms 65 which are pivotally attached to the front shaft 22 (FIGS. 3 and 4). The brace frame arms 65 are of a length to extend upwardly and rearwardly obliquely through the handle 19 in all upward orientations of the handle. A rigid cross bar 67 is secured to and between the brace frame arms 65 and maintains them in a spaced relation which is slightly less than the space between the handle arms 59 so as to permit free reception of the brace frame 64 between the handle arms.

For effecting a readily adjustable connection between the handle 19 and the brace frame 64, the arms 65 of the brace frame comprise bars having on the lower edges of the portions thereof which extend through the handle 19 respective sets of transversely aligned and longitudinally spaced forwardly facing detent shoulders 68 which are selectively engaged in latching, retaining relation with the upper edge of a rigid fixed latch cross bar 69 secured to and between the handle arms 59 at a suitable height above the lower ends of the handle arms. To enable automatic adjustment of the handle forwardly from a rearwardly tilted position wherein the uppermost of the detent shoulders 68 is engaged with the bar 69 to any selected more upright positions determined by succeeding ones of the shoulders 68 downwardly along the brace bars 65, the detent shoulders 68 are formed at the rear sides of respective notches which have forwardly and downwardly extending cam surfaces 69 which guide the lower edge portions of the bars 65 intervening between the shoulders 68 over the edge of the latch bar 69 when the handle 19 is swung forwardly. It will be noted that the brace frame 64 is of substantial length from its forward pivotally attached end to its rear end so that the rear end portion of the brace frame is substantially gravitationally biased, and therefore will drop automatically and positively into each of the shoulder notches as the handle is swung forwardly. Thereby, there will be a sensible indication, audibly and/or vibrationally apparent, which will advise the operator of the device that a selected adjusted interlocked position of the desired detent shoulders 68 and the bar 69 has been reached.

Reverse adjustment of the handle 19, that is rearward swinging to a desired adjusted orientation to be defined by any selected ones of the detent shoulders 68 is adapted to be effected by means of release mechanism carried by the handle 19 and operable by the user of the apparatus without stooping. To this end, the brace frame 64 is provided with a generally U-shaped combination stabilizer and longitudinal shoulder structure 70 having a pair of elongate shoulder bars 71 spaced apart substantially less than the spacing between the frame arms 65 and connected together by an integral base portion 72 secured as by means of screws 73 to the transverse brace bar 67. From the base portion 72, the shoulder arms 71 extend in substantially parallel relation upwardly to transversely aligned and laterally outwardly extending terminal attachment flange portions 74 which are in substantially coextensive overlapped joining relation to complementary inwardly projecting attachment terminal flange portions 75 on the upper ends of the frame side detent bars 75, the terminal flanges 74 and 75 being fixedly secured together as by means of screws 77. Underlying the shoulder bars 71 are lateral trip shoulder bars 71 on a lifter 79 which is desirably in the form of a doubled over plate providing therebetween an upwardly opening slot within which the latch bar 69 is received. Above the latch bar a release pull member 80 is secured to the release member 79 and extends upwardly to a position where the upper end of the member 80 can be readily manipulated near the shovel control lever 23.

In a desirable construction, the pull member 80 comprises a generally elongate bail structure formed from small gauge rod stock providing a pair of arms 81 connected at their upper ends integrally by means of a handle bar 82. At their lower ends, the arms 81 extend between the upper opposed portions of the panels of the pull member 79, and the angular anchoring terminal lugs 82 on the arms 81 extend through complementary anchoring holes 83 (FIG. 4) in one of the panels of the release member 79. Adjacent to the panel bar 82, the pull members 81 extend through guide holes 84 in a transverse reinforcing and pull member guiding bar 85 which is fixedly secured to and between the handle arms 59 as by means of screws 87 at a suitable elevation within the handle 19 spaced at a near location below the lower end of the control lever 23. A guide and stop pin 88 is desirably mounted on the bar 69 and extends through a central downwardly opening guide slot 89 in the member 79, the upper end of the slot 89 providing a stop on the member 79 engageable with the pin 88. Through the described arrangement, the release member 79 normally lies in a lowermost position where the shoulder 78 are free from the shoulder bars 71, but when it is desired to release the brace frame 64 from any of the selectively detent positions relative to the handle 19, a simple upward pull on the handle bar 82 causes the shoulders 78 to engage the shoulder bars 71 and raise the rear end portion of the brace frame 64 and trip it from any interlock position relative to the handle 19.

Figure 7:
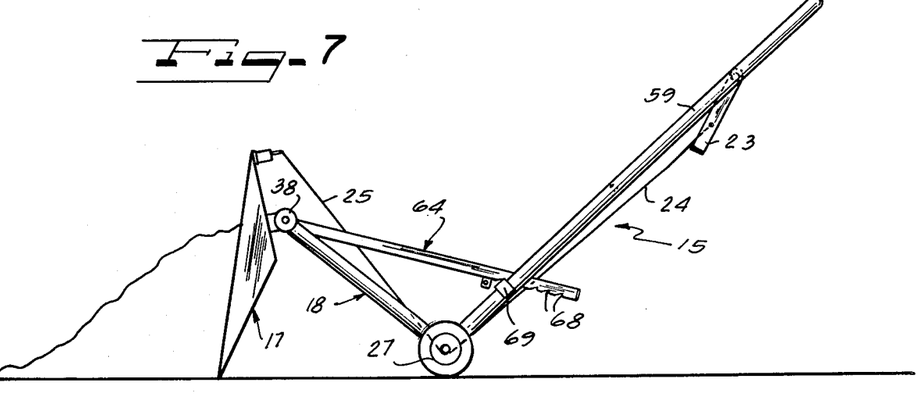
FIG. 7 is a schematic side elevational view of the device demonstrating not only its dumping capability but also its material pushing capability.

In use of the device 15, for movement of loose material, for example, snow removal, the handle 19 is adjusted to suit the convenience of the user to facilitate pushing the device forwardly with the scoop blade 29 in scooping position relative to the surface to be cleared of material or from which material is to be removed and dumped at a different site. The device is then pushed into the material until the shovel 17 is loaded. If it is then desired to dump the shovel load in a windrow or at one end or one side of the surface being cleared, the control lever 23 may be pulled back to release the shovel 17 and the front end of the frame 18 is upended by rocking the handle rearwardly about the axis of the shaft 28 so that the shovel can upend substantially as shown in FIG. 7 and dump the material therefrom. It may be pointed out that the length of the control cable 25 is desirably such that when the control lever 23 has been dropped to its lowermost position, the shovel 17 will be held in the generally upended position as shown in FIG. 7 and the shovel may then be employed as a pusher, the mounting of the shovel in relation to the frame 18 being such as to provide excellent mechanical advantage for the material moving pushing operation. Such an arrangement is especially suitable for moving light fallen snow. On the other hand, if it is desired to lift a load in the shove 17, the control lever 23 is left in its overcenter or toggle latch position and by tilting the handle 19 rearwardly, the loaded shovel 17 is lifted as shown in dot-dash outline in FIG. 6, and the load can be wheeled by means of the wheels 27 to any desired dumping position. Thus, by releasing the control lever 23 rearwardly, the shovel 17 is released to upend and dump the load. Thereafter the shovel 17 can be easily returned to the scooping position by forwardly tilting the device, engaging the scoop edge 31 with the surface on which the device is engaged, and by rearward pull on the device, the shovel drops back to its scooping position which can then be maintained selectively by returning the control handle 23 to the toggle latch position. By having the handle 19 readily adjustable on the frame 18, as permitted by the selectively releasable detent relationship of the handle to the brace frame 64, all of the maneuvers relating to scooping, dumping, pushing, lifting and wheeling, throughout the full range of operation of the device can be accomplished by a person remaining substantially erect. Therefore the device 15 is a very useful tool for especially persons who would find it difficult or impossible to use the device if bending or stooping were required.

Figures 8, 9, 10, 11:
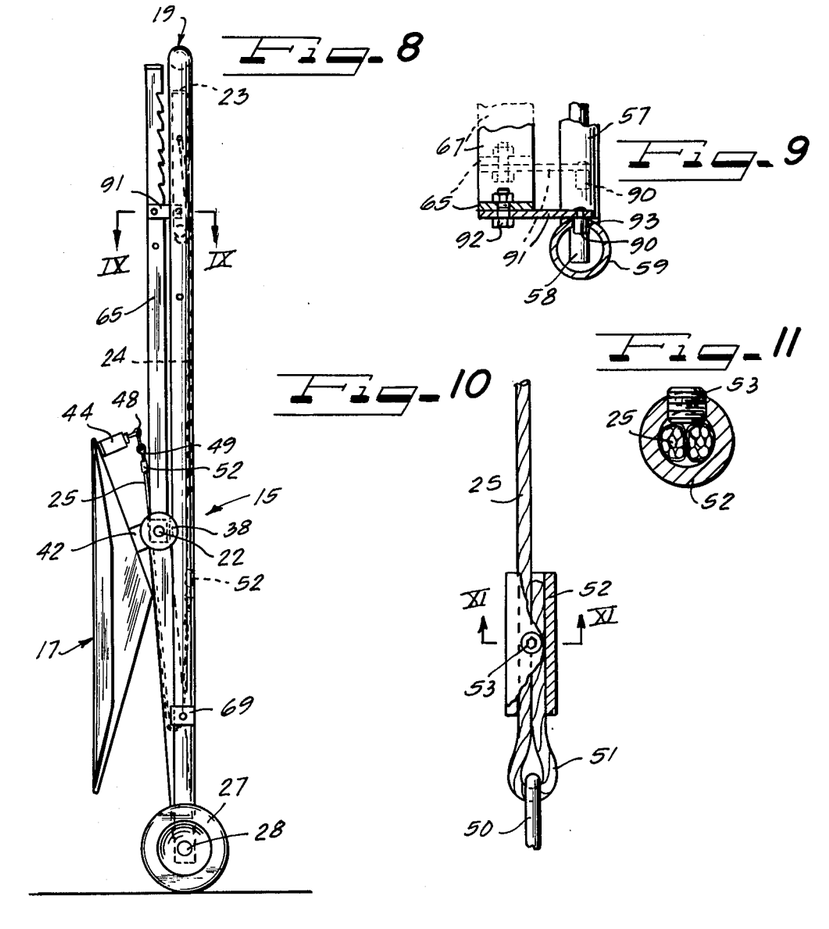
FIG. 8 is a side elevational view of the device in collapsed condition for storage or to facilitate transportation.
FIG. 9 is a fragmentary sectional detail view taken substantially along the line IX—IX of FIG. 8.
FIG. 10 is an enlarged fragmentary detail view taken substantially along the line X—X of FIG. 5 and partially broken away for illustrative purposes.
FIG. 11 is an enlarged sectional detail view taken substantially along the line XI—XI in FIG. 10.
Figures 12, 13:
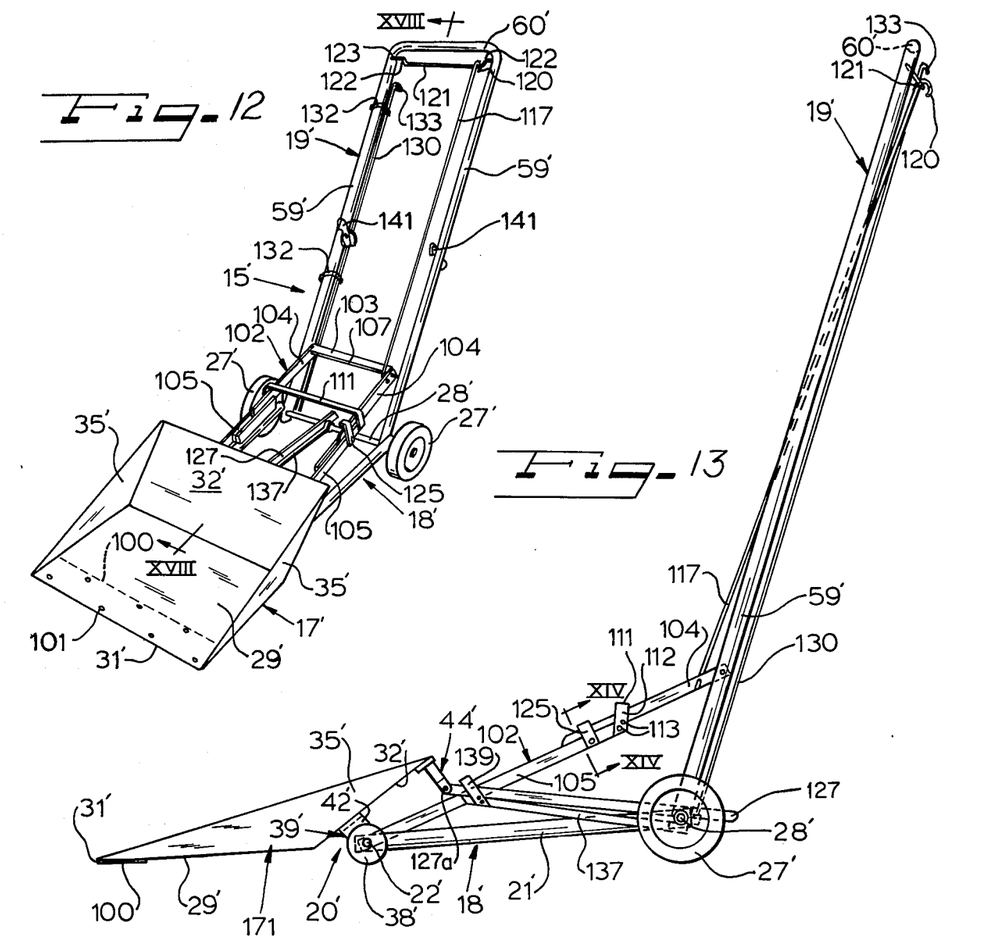
FIG. 12 is a perspective view of a modification.
FIG. 13 is a side elevational view of the modification of FIG. 12.
Figures 14, 15:
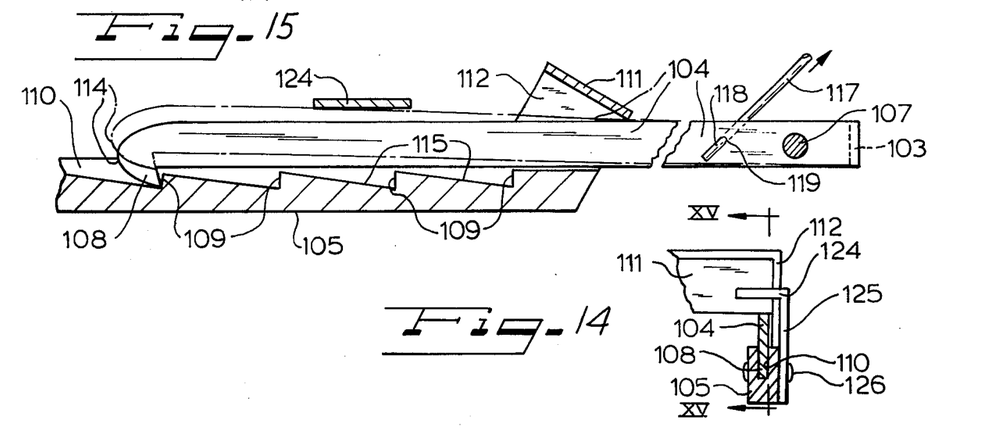
FIG. 14 is an enlarged fragmentary sectional elevational detail view taken substantially along the line XIV—XIV of FIG. 13.
FIG. 15 is a sectional elevational view taken substantially along the line XV—XV of FIG. 14.

In view of the articulated relationship of the various major components of the device 15, it can be readily collapsed into a compact storage condition as exemplified in FIG. 8. For this purpose, the control cable 25 may be detached from the shovel 17 by manipulation of the releasable latch 49. The brace frame 64 may then be lifted from the handle retaining position and moved upwardly toward parallel position with the upper front portion of the handle 19. In this maneuver, the frame bars 21 are pulled upwardly and the shovel 17 swings downwardly. As thus collapsed, the assembly is adapted to be locked against unintended spreading open by means of fixed releasable locking detents 90 (FIGS. 8 and 9) projecting laterally outwardly on tabs 91 secured as by means of screws 92 to the outer sides of the brace from arms 65. Each of the handle arms 59 has a respective latching aperture 93 receptive of the locking detent 90 nearest thereto. Release of the detents 90 is readily effected by resiliently deflecting the upper end portions of the arms 65 on which the detent tabs 91 are mounted as exemplified in dot-dash outline in FIG. 9, to release the detents 90 from the socket apertures 93. To maintain the control cable 75 out of the way in the collapsed condition of the device, the latch 49 may be reapplied to the eye 48. Thenm when the device is again extended for operation, the cable 25 can be again released and brought in under the shaft 28 and reapplied to the coupling eye 48.

In the modification of FIGS. 12–19, the principles of general construction, operation and function, are substantially the same as in the already described embodiment of the invention, but the mechanisms for controlling various operating phases of the device and the relative attitudes of the several cooperating parts have been substantially simplified. To this end, the device 15' has a scoop shovel 17', a mobile frame 18' having generally upright handle means 19', means 20' pivotally mounting the scoop shovel 17' on a forward portion 21' of the mobile frame 18' for pivoting about a horizontal axis provided by axle means 22' between scooping and dumping positions relative to the frame 18'. Wheels 27' are mounted on axle shaft means 28' to which the lower ends of spaced upstanding elongate arms 59' of the handle 19' are pivotally connected. At their upper ends, the handle arms 59' are integrally connected by rigid handle cross bar 60'. The rear ends of the two spaced parallel forward frame portion bars 21' are also pivotally connected to the axle shaft means 28'. At their front ends, the frame bars 21' are pivotally connected to the axle means 22' which also mount rollers 38' for supporting the shovel 17' rearwardly from the front edge 31' of the shovel bottom or scoop blade 29' against contact with an underlying surface. A reinforcing strip 100 of harder or more wear resistant material is desirably fixed as by means of rivets 101 to the underside of the scoop shovel edge 31'. This permits the shovel 17' including the base wall 29', rear wall 32' and side walls 35' to be made from relatively lightweight materials, such as aluminum or suitable plastic. Bracket means 39' on the shovel back wall 32' comprise journaled flange means 42' mounting the axle means 22'.

For tiltably adjusting the handle 19' relative to the forward portion 21' of the frame and thereby relative to the shovel 17', means are provided which comprise an adjustable frame brace 102 which extends in generally hypotenuse of a triangle relation between the handle 19' and the front end of the frame 18'. To this end, the adjustable brace 102 comprises a generally U-shaped member having a horizontal bar 103 connecting generally forwardly and obliquely downwardly extending arms 104 which are coupled for longitudinal adjustment with respective brace bars 105 pivotally connected to respectively opposite sides of the front end of the forward frame portion 21' as by means of the axle means 22'. At their ends, adjacent to the connecting bar 103, the adjustable frame bars 104 are pivotally connected between the handle arms 59' by means of a shaft 107. At their forward ends, each of the adjustable brace frame arms 104 has a depending detent or pawl 108 (FIGS. 15 and 18) projecting downwardly and biased generally rearwardly and engageable selectively with upstanding forwardly facing longitudinally spaced ratchet shoulder 109 provided on the rear portions of the associated bars 105. In a desirable form, the bars 104 are relatively thin with their major cross-sectional dimension vertical and are received slidably in complementary respective guide channels 110 (FIGS. 14 and 15) in the upper edges of the rear portions of the bars 105.

For retaining the bars 104 against unintentional escape from the guide channels 110, means comprising a retainer bar 111 overlies the rear extremities of the bars 105 and engages with the upper edges of the bars 104 in such a manner that a gravity fulcrum relationship is effected whereby the pawls 108 are normally urged downwardly into engagement with the selected detent or ratchet shoulder 109. At its opposite ends, the bar 111 has downwardly projecting attachment flanges 112 which are secured fixedly as by means of rivets 113 to the bars 105. To facilitate assembling the arms 104 with the arms 105, the bar 111 has merely a rear edge thereof disposed for engagement with the arms 104 and the remainder of the bar 111 is disposed in adequate clearance relation to the arms 104 to avoid any interference with the assembly process. The relative lengths of the arms 104 and 105 is such that for assembling the same together, the handle 19' is dropped to a rearward generally inline position relative to the forwardly projecting bucket 17' and the forwardly projecting portion 21' of the frame, whereby the front ends of the arms 104 are in barely clearance relation to the rear ends of the arms 105 and adapted to be moved into the guidance slots 110 past the fulcrum bar 111 by aligning respective rounded cam front ends 114 on the front terminals of the arms 104 with the respective slots 110. By virtue of the rounded cam terminals 114, the front ends of the arms 104 cam easily and without any hangup passed the fulcrum edge of the fulcrum bar 111 as the handle 19' is raised to project the arms 104 forward into the slots 110. As the handle 119' is raised, the terminal detent pawls 108 drop toward engagement with each successive one of the ratchet shoulders 109 starting with the first such shoulders adjacent to the rear ends of the arms 105, and depending on the particular upstanding attitude desired for the handle 19'. To facilitate the automatic progression of the pawl 108 into engagement with the successive shoulders 109, respective oblique ramps 115 extend from the base of each of the shoulders 109 to the crest of the next succeeding shoulder, the cam terminal 114 being adapted to ride the ramp surfaces 115 from one shoulder 109 to the next shoulder 109 for automatic adjustment of the upstanding attitude of the handle 19' as the user pushes the handle to the particular upstanding attitude he prefers at any given time. The fulcrum bar 111 biased by the weight of the arms 105 thrusts downwardly on the arms 104 whereby to assure positive interlocking of the pawls 108 with the ratchet shoulders 109, further aided by the rearward bias of the handle 19', either by manual pressure or by gravity tending to swing the handle 19' rearwardly about its pivot axis at the shaft 28'.

When it is desired to release the pawls 108 from any of the ratchet shoulders 109, means comprising a release rod 117 are activated. In a desirable arrangement, the release rod has a lower offset journal terminal 118 engaged through a bearing hole 119 transversely in one of the arms 104, a short distance forwardly from the pivot axis provided by the shaft 107. The release or trip rod 117 extends upwardly to and has on its upper end a bearing loop 120 engaged about a crank bar 121 which has opposite offset aligned oppositely projecting trunnion terminals 122 which are pivotally engaged in respective bearing apertures 123 at the inner sides of the upper end portions of the handle arms 59'. This location of the crank bar 121 enables quick and easy digital manipulation of the crank bar 121 by the fingers of one or both hands of the user while engaged with the handlebar 60'. Through this arrangement, when it is desired to shift the handle 19' to a more rearward attitude, the user simply pulls up on the crank bar 121, which causes it to rotate and pull the release rod 117 upwardly, correspondingly pulling up the arms 104 about the shaft pivot 107 and causing the arms 104 to raise the fulcrum bar 111 whereby to break the rear end portions of the arms 105 upwardly at the same time that the ratchet terminal ends of the arms 104 are swung upwardly (in phantom outline in FIG. 15), thus releasing the pawls 108 from the engaged shoulders 109 and permitting the arms 104 to be pulled rearwardly until the pawls 108 engage the selected rearward shoulder 109 as may be effected by releasing the crank rod 121, so that the release rod 117 and the arms 104 are permitted to drop gravitationally and under the bias of the fulcrum bar 111, whereby to then hold the desired adjusted relationship of the arms 104 and 105, and the desired attitude of the handle 19'. In order to hold the arms 104 within the narrow limits of upward swinging needed for clearing the pawls 108 relative to the shoulders 109, and avoiding lateral escape of the pawls 108 from the grooves 110, a stop flange 124 is mounted in proper overlying relation to one of the arms 104, at a suitable adjacent position forwardly from the fulcrum bar 111. Desirably the stop flange 124 is carried by a bracket 125 (FIG. 14) secured as by means of a rivet 126 to the outer side of the bar 105 with which cooperates the bar 104 that has the release rod 117 operatively connected thereto.

Means are provided for normally maintaining the shovel 17' in the scooping attitude relative to the frame 18', but releasable when desired for dumping as described with respect to FIG. 4, or pushing as described with respect to FIG. 7. For this purpose, a latch bar 127 extends rearwardly from a pivotal connection at 127a with the center of the bracket structure 44' carried by the upper rear portion of the shovel wall 32'. The latch bar 127 is of sufficient length to extend rearwardly into overlying relation to the rear shaft 28' (FIGS. 18 and 19) where releasable catch means are provided. In a desirable structure, the catch means comprise a downwardly extending and forwardly facing shoulder 127b on the rear end portion of the latch bar 127 engageable rearwardly of the shaft 28' with a catch bar 128 having mounting ears 129 pivotally engaged with the shaft 28' in such manner that the bar 128 normally swings downwardly behind the shaft 28' by gravity bias. The catch bar 128 is of sufficient length to extend from operative association with the latch bar 127 at about the center of the shaft 28' to adjacent the lower end portion of one of the handle arms 59', where actuating means comprising a trip rod 130 is pivotally attached at its lower end to a rearwardly extending trip boss or bracket 131 on the bar 128. The trip rod 130 extends upwardly along the adjacent handle arm 59' and is guided by suitable means such as spaced guide loops 132. On its upper end, the rod 130 has a knob or handle 133 located conveniently adjacent to the handle bar 60' for digital manipulation by the hand of the user. By pulling up on the handle 133, the rod 130 functions to pull up on the catch bar 128 whereby to raise the latch bar 127 until the shoulder 127b can escape the latch bar 128. The construction and arrangement of the catch bar 128 and the trip or release rod 130 are such that they may be oriented for the convenience of the user at either the right side or the left side of the handle 19', being shown at the right side because most users are right-handed. For left-handed users, it is a simple matter to reverse the orientation.

Normal downward gravity bias of the catch bar 128 is assured by reason of its substantial offset relation relative to the shaft 28'. Gravity bias of the latch bar 127 is assured by the weight of the freely pivoted, substantial length of the bar itself. Conveniently where the rear end portion of the latch bar 127 passes over the shaft 28', a downwardly opening recess 134 receives the shaft and thereby the bar 127 rests on the shaft and the latching shoulder 127b extends substantially below the center of the shaft into engagement with the upper edge of the catch bar 128, which is also below the center of the shaft 28'. Therefore, forward pull on the latch bar 127 imposed by the weight of the shovel 17' to which the front end of the bar 127 is attached, tends to bias the catch bar 128 forwardly and downwardly toward and into engagement with a stop 135 on the rear end of a forwardly projecting guide bar 137 which has its rear end portion suspended from the shaft 28' by hangar means 138. This arrangement assures that loading of the shovel 17' will, if anything, improve the latching retention engagement between the latch bar shoulder 127b and the catch bar 128.

The guide bar 137 extends in alignment under the latch bar 127 and has its front end adjacent to the front end of the overlying bar 127. Means comprising an inverted U-strap member 139 fixedly secured as by means of rivets 140 to the guide bar 137 has the bar 127 extending therethrough and serves to retain the latch bar 127 in slidable engagement on the guide bar 127 when the latch bar is released from the catch bar 128 for releasing the shovel 17' for dumping or material pushing.

Figures 16, 17, 18, 19:
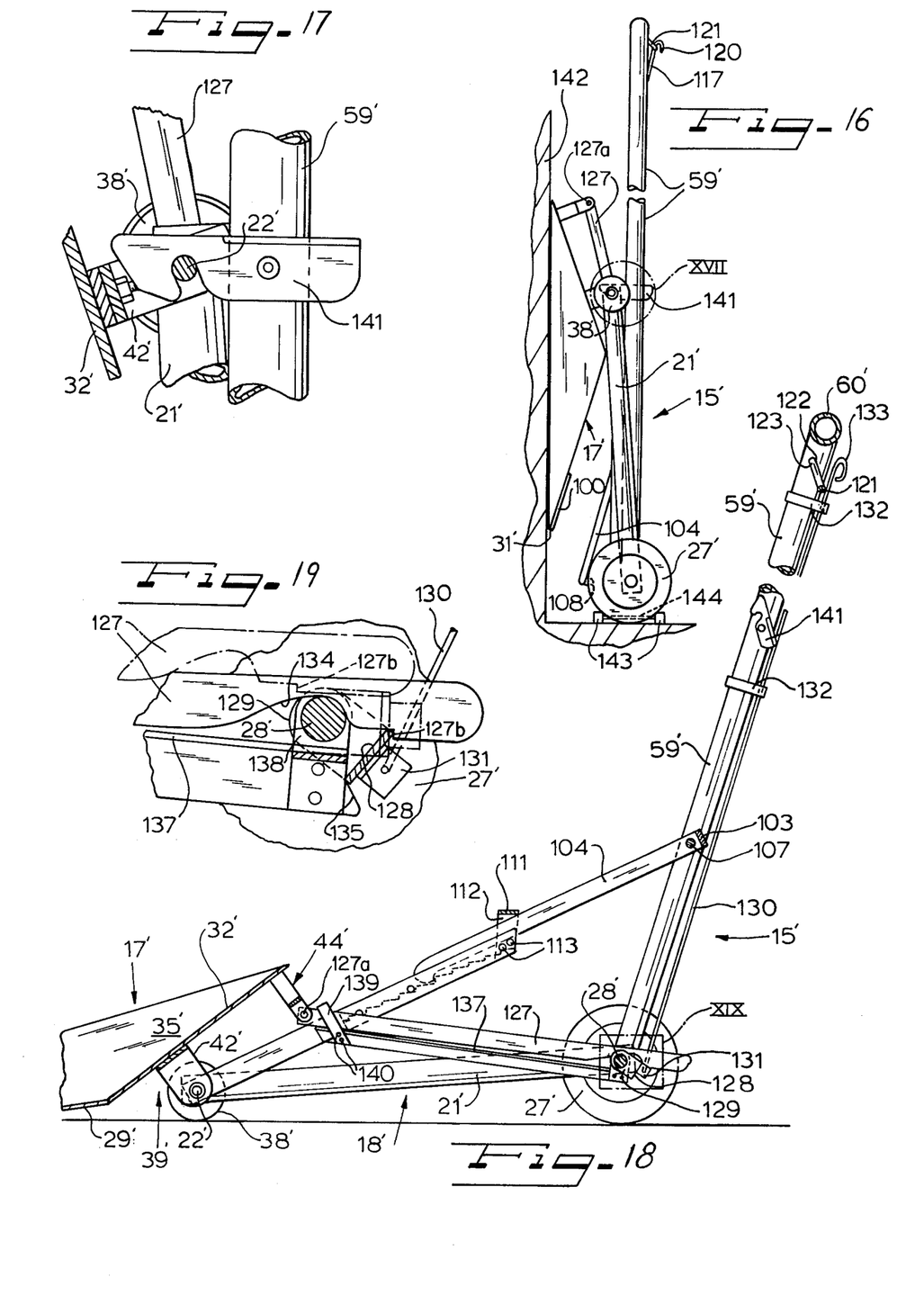
FIG. 16 is a side elevational view showing the device of FIG. 12 in collapsed storage condition.
FIG. 17 is an enlarged fragmentary sectional elevational detail view taken substantially within the dashed circle XVII of FIG. 16.
FIG. 18 is an enlarged fragmental sectional elevational view taken substantially along the line XVIII—XVIII of FIG. 12.
FIG. 19 is an enlarged fragmentary sectional elevational view taken substantially within the dashed square XIX of FIG. 17.

Collapsing of the device 15' for storage purposes is easily effected. First the latch bar 127 is released, the front end of the frame 18' is raised by pivoting about the axis of the rear wheels 27' and the shovel 17' permitted to swing down and then by catching its scooping edge 31' on the underlying surface and pushing forwardly causing the shovel 17' to become inverted. Then the handle attitude adjustment arms 104 are released from the arms 105 and the handle 19' dropped to the underlying surface. Next, using the fulcrum bar 111 as a handle, the bars 105 are lifted and the front terminals of the bars 104 permitted to escape the rear end of the guide slot 110. Thereupon, the handle 19' is adapted to be swung up and then forwardly and downwardly into collapsed position overlying the shovel, and more particularly the axle means 22'. Finally, pivotally mounted hook latches 141, one of each of which is mounted on each of the handle arms 59', is swung from inactive position into hooked latching relation to the associated portion of the axle means 22', as best visualized in FIGS. 16 and 17. By then lifting up on the handle 19' and pivoting the device about the axis of the shaft 28', the device now held in collapsed condition by means of the hook latches 141 can be wheeled on the wheels 27' to any desired storage place. For example, as shown in FIG. 16, the device may be stored up against a wall 142 by engaging the collapsed shovel 17' up against the wall where normally due to fairly well balanced condition of the device in its upright collapsed condition, the device may retain its stored position. For assurance that the device will not roll out of its stored position due to being jarred, locking means may be provided for the wheels 27'. In a simple and convenient form, such locking means comprises as shown, a pair of spaced parallel chock bars 143 held in preferred spaced relation by means of connectors 144 adjacent to their opposite ends. The spacing between the bars 143 is sufficient to receive the wheels 27' therebetween and to prevent running of the wheels in either direction. The advantage of this chock bar device is that it is easily transportable and may be supplied as part of the original equipment with the device 15', if desired.

From the foregoing, it will be apparent that the present invention provides a manual shovelling and dumping device which is environmentally advantageous because it is strictly manually motivated and requires no air and noise polluting fuel or even non-polluting power. Loose material such as snow or the like can be moved without any load lifting, but if shovel load lifting is necessary, the device affords such advantageous load lifting leverage and free wheeling that minimum effort is needed for such maneuver. When scoop loading, the free wheeling roller mounting of the scoop shovel substantially eliminates shovel friction. The user can remain substantially erect and need exert only minimal effort when using the device, throughout its range of usefulness. When not in use the device can be so compactly collapsed that it can be stored, packed or transported in minimum space.

It will be understood that variations and modifications may be effected without departing from the spirit and scope of the novel concepts of this invention.

I claim as my invention:

1. A manually operable shovelling and dumping device especially adapted, for snow removal and the like, comprising:
    a scoop shovel having a front scooping edge;
    a mobile frame having generally upright handle means;
    wheel means mounting said frame adjacent to the lower end of said handle means;
    means including horizontal shaft means pivotally mounting said scoop shovel on a front end portion of said frame and which extends forwardly from said wheel means for pivoting of said scoop shovel about the horizontal axis of said shaft means between scooping and dumping positions relative to said frame;

means adapted to be manipulated near the top of said handle means for controlling said scoop shovel in respect to said scooping and dumping positions;

said wheel means permitting rocking of said frame by manipulation of said handle to raise said forwardly extending portion of said frame to facilitate pivoting of said scoop shovel between said scooping and dumping positions;

and anti-friction roller means rotatably carried by said shaft means and supporting the scoop shovel against contact rearwardly from said scooping edge with an underlying surface over which the device is operated;

all of said means being cooperatively related to permit operation of the device with minimal effort by a person remaining substantially erect throughout a full range of scooping and dumping maneuvers of the device.

2. A device according to claim 1, wherein said means for controlling said scoop shovel comprise a control member and means connecting said control member to an upper rear portion of said scoop shovel.

3. A device according to claim 2, including a shaft mounting the lower end of said handle means and also mounting said wheel means, said control member comprising a flexible element guided under said shaft.

4. A device according to claim 3, wherein said means for controlling said scoop shovel comprise a manipulating lever, means rockably supporting said lever for front to rear movement near the top of said handle means, and means connecting said flexible control element to said lever for overcenter latching retention of said lever by rocking of said lever in one direction for holding said scoop shovel in its scooping position, and said lever being adapted for releasing said control element upon rocking of the lever in the opposite direction to permit the scoop shovel to assume its dumping position.

5. A device according to claim 1, wherein said handle means and said forwardly projecting portions are pivotally connected, a frame brace extending generally upwardly and rearwardly from said forwardly extending frame portion to said handle means, and means for controlling said brace relative to said handle means for attaining various selected pivotally adjusted upright positions of the handle means.

6. A device according to claim 5, including means operable near the top of said handle means for controlling said brace.

7. A device according to claim 6, wherein said forwardly extending portion of said frame and said brace together with said scoop shovel are adapted to be collapsed toward said handle means for compact storage, and releasable means for maintaining the collapsed relationship.

8. A device according to claim 1, wherein said frame includes a brace frame structure extending generally upwardly and rearwardly from said means pivotally mounting said scoop shovel, said handle means being pivotally mounted relative to said forwardly extending frame portion for front to rear adjustment, and means for adjusting said brace frame structure relative to said handle means for maintaining various selected pivotally adjusted positions of the handle means.

9. A device according to claim 8, including means operable near the top of said handle means for effecting said adjusting of said brace frame structure.

10. A device according to claim 9, wherein said adjusting means permit free forward swinging adjustments of the handle means relative to the brace frame structure and said means operable near the top of the handle means are operative for controlling selective rearward swinging adjustments of the handle means relative to the brace frame structure.

11. A device according to claim 1, wherein said frame and said scoop shovel are adapted to be collapsed together for compact packing or storage, and releasable means for maintaining the collapsed relationship.

12. A device according to claim 11, including means for retaining said wheel means against rolling, so that the collapsed device can be stored upright on said wheel means without liability of unintentional displacement.

13. A device according to claim 12, wherein said retaining means comprise a pair of chock bars adapted to receive the wheel means therebetween, and means retaining the chock bars against separation from predetermined spacing.

14. A device according to claim 1, wherein said means pivotally mounting said scoop shovel on a forward portion of said frame include mounting means on a back wall of the scoop shovel, and said means for controlling said scoop shovel comprise an element attached to an upper part of said back wall.

15. A device according to claim 1, wherein said means for controlling said scoop shovel comprise a flexible cable, means for attaching an end portion of the cable to said scoop shovel, said end portion of the cable comprising a loop engaged with said attaching means, and a splicing device comprising a ferrule engaged about the cable and a terminal part of said end portion retaining said terminal part and the cable in juxtaposition within the ferrule, and a set screw securing said end portion of the cable and the cable positively within the ferrule.

16. A device according to claim 1, including a shaft mounting the lower end of said handle means and also mounting said wheels, and said means for controlling said shovel comprising structure associated with and extending from said shaft forwardly to the back portion of said shovel and also extending from said shaft upwardly and adapted to be manipulated near the top of said handle means.

17. A device according to claim 16, wherein said structure comprises a latch bar pivotally attached to the back portion of the shovel and extending into overlying relation to said shaft and having a forwardly facing latching shoulder on its rear end portion rearwardly from said shaft, a releasable catch carried by said shaft in rearward and downward over-center relation and retainingly engageable by said latching shoulder, and a trip member extending from said catch upwardly toward said handle to be manipulated near the top of said handle means, whereby said trip member is adapted to be actuated to raise said catch from said over-center relation and release said latch shoulder, said latch bar and catch being automatically resettable into latching relation.

18. A device according to claim 17, including guide means for longitudinally guiding said latch bar.

19. A device according to claim 17, wherein said guide means comprise a bar mounted on said shaft and extending forwardly therefrom underlying said latch bar, and means maintaining said guide bar and said latch bar in aligned relation.

20. A device according to claim 1, wherein said frame includes a generally diagonally oriented brace structure extending upwardly and rearwardly from said means pivotally mounting said scoop shovel to a connection with said handle means, said brace structure comprising a pair of forwardly extending arms pivoted on said handle means and a complementary pair of arms extending from said pivotally mounting means, means on said arms for maintaining them in selected longitudinally adjusted relation for thereby controlling the attitude of said handle means relative to said shovel, and release means extending from said forwardly extending arms to adjacent the top of said handle means and operable to actuate said forwardly extending arms pivotally for effecting adjustments of the forwardly projecting arms relative to the rearwardly projecting arms.

21. A manually operable shovelling and dumping device especially adapted for snow removal and the like, comprising:
a scoop shovel having a front scooping edge;
a mobile frame for maneuvering said scoop shovel, said frame having generally upright handle means having wheel means at its lower end;
a forward frame extension having rear pivot means connecting it to the lower end of said handle means and projecting forwardly from said handle means and having front pivot means connecting it to said shovel;
means for controlling the upstanding attitude of said handle means relative to said forward frame extension comprising a diagonal brace structure having a first portion pivotally connected, on a common axis with said front pivot means, to said forward portion of said frame extension and a second portion pivotally connected to said handle means substantially above said rear pivot means;
and means connecting the first and second portions for selective longitudinal adjustment for effecting pivotal adjustments of the handle means relative to said frame extension.

22. A device according to claim 21, including means operable from adjacent to the top of said handle means for controlling said connecting and adjustment means of said brace structure portions.

23. A device according to claim 22, wherein said first portion comprises a pair of arms and said second portion comprises a pair of complementary arms, and said connecting and adjustment means comprise pawl and ratchet shoulder means on said arms.

24. A manually operable shovelling and dumping device especially adapted for snow removal and the like, comprising:
a scoop shovel having a front scooping edge;
a mobile frame having generally upright handle means;
means pivotally mounting said scoop shovel on a portion of said frame extending forwardly from the lower end of said handle means;
wheel means mounting said lower end of said handle means and including a horizontal shaft;
means for controlling said shovel between scooping and dumping positions relative to said forwardly extending portion of said frame and comprising an elongate structure having a rear end portion at said shaft and projecting forwardly to means connecting a front end portion of said structure to a rear portion of said shovel;
and actuating means extending downwardly from adjacent to the top of said handle means and connected to said rear end portion of said structure;
said actuating means being operable from adjacent to to top of said handle means for actuating said structure for said controlling of said shovel.

25. A device according to claim 24, wherein said elongate structure comprises a flexible element attached at one end to said shovel and extending under said shaft and said actuating means includes an extension from the rear end of said element and which extension is connected to means for operating the element and located adjacent to the top of said handle means.

26. A device according to claim 24, including means cooperating between said forwardly extending portion of said frame and said handle means for adjusting the angular relation between said handle means and said forwardly extending portion.

27. A manually operable shovelling and dumping device especially adapted for snow removal and the like, comprising:
a scoop shovel having a front scooping edge;
a mobile frame having generally upright handle means;
means pivotally mounting said scoop shovel on a portion of said frame extending forwardly from the lower end of said handle means;
wheel means mounting said lower end of said handle means and including a horizontal shaft;
means for controlling said shovel between scooping and dumping positions relative to said forwardly extending portion of said frame and comprising an extension from said shaft to said shovel and operable from adjacent to the top of said handle means;
said controlling means comprise a latch member extending from said shovel to said shaft;
and keeper means carried by said shaft and cooperating with said latch member.

28. A device according to claim 27, including trip means operable from adjacent to the top of said handle means for controlling said keeper means.

29. A device according to claim 1, wherein said scoop shovel has a generally rearwardly facing wall, bracket means carried by said rearwardly facing wall, and said shaft means mounted on said bracket means.

* * * * *

UNITED STATES PATENT AND TRADEMARK OFFICE
CERTIFICATE OF CORRECTION

PATENT NO. : 4,302,894
DATED : December 1, 1981
INVENTOR(S) : Sam F. Emma

It is certified that error appears in the above—identified patent and that said Letters Patent is hereby corrected as shown below:

Column 4, line 1, after "obliquely" cancel "inwardly" and substitute --upwardly--;

Column 7, line 7, cancel "members" and insert --member arms--;

Column 7, line 43, cancel "lowermost" and insert --lowest--;

Column 8, line 32, correct the misspelling of --Then--;

Column 10, lines 31-32, "corresponding" should be --correspondingly--;

Signed and Sealed this

Eighteenth Day of May 1982

[SEAL]

Attest:

GERALD J. MOSSINGHOFF

Attesting Officer

Commissioner of Patents and Trademarks